(12) United States Patent
Marr

(10) Patent No.: US 10,963,140 B2
(45) Date of Patent: Mar. 30, 2021

(54) AUGMENTED REALITY EXPERIENCE CREATION VIA TAPPING VIRTUAL SURFACES IN AUGMENTED REALITY

(71) Applicant: John William Marr, Philomath, OR (US)

(72) Inventor: John William Marr, Philomath, OR (US)

(*) Notice: Subject to any disclaimer, the term of this patent is extended or adjusted under 35 U.S.C. 154(b) by 0 days.

(21) Appl. No.: 16/669,280

(22) Filed: Oct. 30, 2019

(65) Prior Publication Data

US 2020/0326831 A1 Oct. 15, 2020

Related U.S. Application Data

(60) Provisional application No. 62/833,027, filed on Apr. 12, 2019, provisional application No. 62/833,021, filed on Apr. 12, 2019, provisional application No. 62/833,003, filed on Apr. 12, 2019.

(51) Int. Cl.
| | |
|---|---|
| *G06F 3/0484* | (2013.01) |
| *G06T 7/70* | (2017.01) |
| *G06T 19/00* | (2011.01) |
| *G06K 9/00* | (2006.01) |

(52) U.S. Cl.
CPC ..... *G06F 3/04842* (2013.01); *G06K 9/00664* (2013.01); *G06T 7/70* (2017.01); *G06T 19/006* (2013.01); *G06T 2200/24* (2013.01)

(58) Field of Classification Search
CPC .................................................. G06F 3/04842
See application file for complete search history.

(56) References Cited

U.S. PATENT DOCUMENTS

| | | | |
|---|---|---|---|
| 10,803,669 B1* | 10/2020 | Roche | G06T 19/006 |
| 2011/0169927 A1* | 7/2011 | Mages | G06F 3/04815 348/51 |
| 2011/0310227 A1* | 12/2011 | Konertz | G06T 19/006 348/46 |
| 2014/0033078 A1* | 1/2014 | Goldman | G06Q 30/02 715/757 |
| 2014/0129990 A1* | 5/2014 | Xin | G06K 9/6201 715/849 |
| 2015/0040074 A1* | 2/2015 | Hofmann | G06F 3/04815 715/852 |
| 2015/0062123 A1* | 3/2015 | Yuen | G06T 19/20 345/420 |
| 2017/0278289 A1* | 9/2017 | Marino | G06Q 30/0276 |
| 2018/0158250 A1* | 6/2018 | Yamamoto | G06F 3/011 |
| 2019/0180506 A1* | 6/2019 | Gebbie | G06T 19/20 |
| 2019/0340821 A1* | 11/2019 | Chen | G06F 3/017 |
| 2020/0106965 A1* | 4/2020 | Malia | G06F 1/1694 |

(Continued)

*Primary Examiner* — Daniel Rodriguez

(57) ABSTRACT

A method and system for presentation of an augmented reality experience is disclosed. The method for producing the augmented reality viewing experience comprises viewing real-world objects such as 2D and 3D works of art or other objects through a portable device such as a smart phone, tablet or augmented reality goggles. An augmented reality application controlling the augmented reality experience prompts the viewer to begin the experience. Both three-dimensional and two-dimensional multi-media presentations, such as an animation telling a story related to the real-world object are displayed on the portable device in one or more virtual screens anchored to the real-world object.

18 Claims, 11 Drawing Sheets

(56) References Cited

U.S. PATENT DOCUMENTS

| | | | |
|---|---|---|---|
| 2020/0250852 A1* | 8/2020 | Wei | G06T 19/20 |
| 2020/0257245 A1* | 8/2020 | Linville | G06F 3/0482 |
| 2020/0342669 A1* | 10/2020 | Nattinger | G06T 19/006 |

* cited by examiner

AUGMENTED REALITY EXPERIENCE CREATION VIA TAPPING VIRTUAL SURFACES IN AUGMENTED REALITY

CROSS REFERENCE TO PRIORITY APPLICATIONS

This Application claims the benefit of U.S. Provisional Applications 62/833,003, 62/833,021 and 62/833,027, all filed on Apr. 12, 2019.

BACKGROUND

Augmented reality is increasing in popularity for experiential enhancement in entertainment, gaming and education. Contrasted to virtual reality, where a virtual three-dimensional (3D) world may be created for a user that has no relation to the user's immediate environment, augmented reality (AR) may add virtual objects and/or sounds to real world environment of the user. Whereas the virtual reality experience creates the illusion that the user is transported or transformed to another existence, AR enhances the real world experience of the user by inserting the virtual objects within the visual field of the user. AR relies on digital displays that may be incorporated into wearable goggles or glasses, or as screens for portable devices such computer tablets or smart phones.

Virtual objects used in AR may be still or animated. In many instances, virtual objects are presented as a multimedia content, such as an animated drawing with audio, a slide show or a short video clip. In the current technologically enhanced world there are many forms of virtual. Augmented and mixed reality. Some uses include video games, lifestyle, travel and art. Typically the use of augmented or mixed reality includes the appearance of a video playing over the top of a printed trigger image as if the print itself were a digital monitor rather than a physical image.

BRIEF DESCRIPTION OF THE DRAWINGS

The features and embodiments claimed in this disclosure are shown in the following figures.

DETAILED DESCRIPTION

Figure 1:
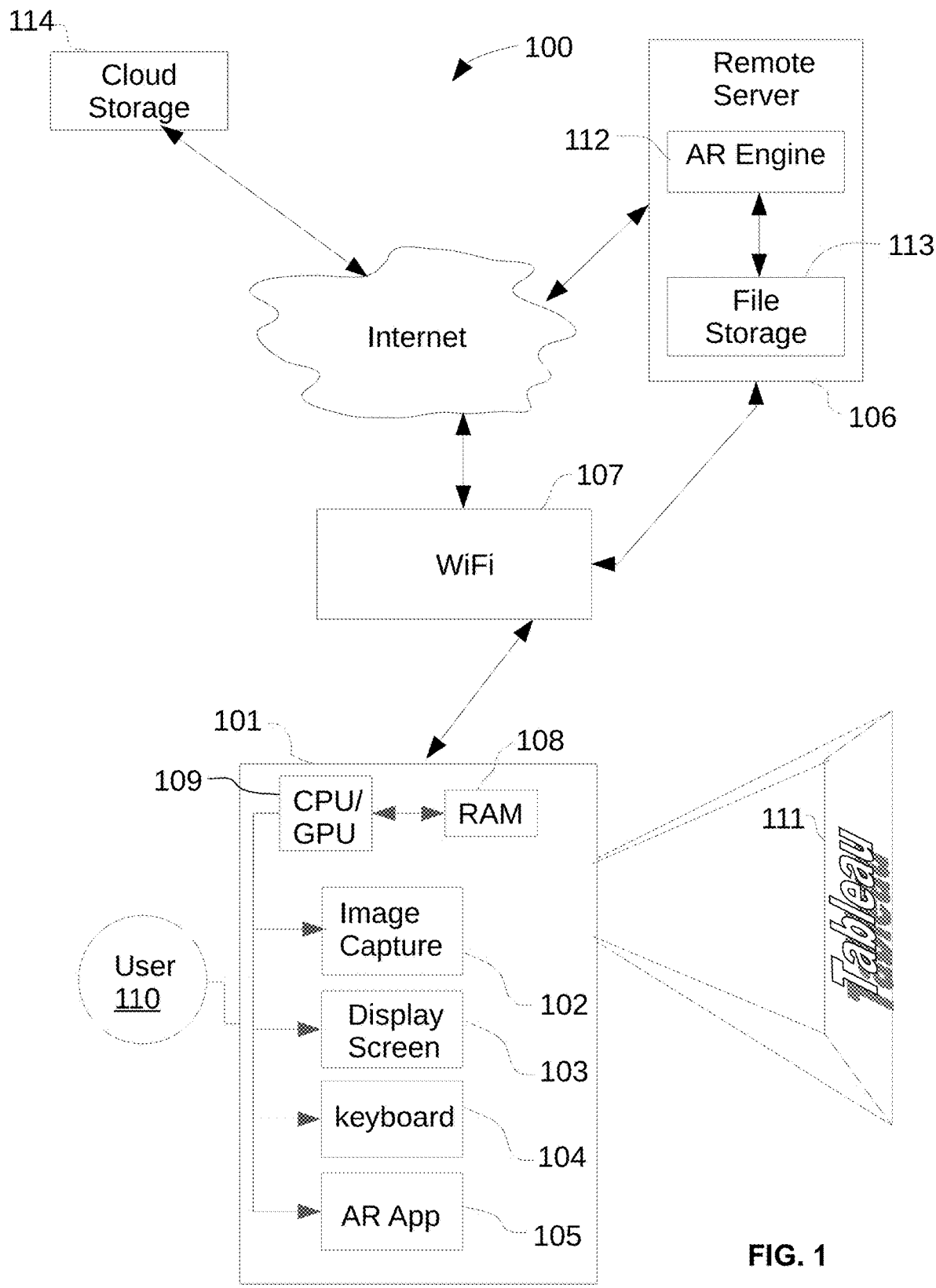
FIG. 1 illustrates a device network implementation of an AR system, according to some embodiments of the disclosure.

A system and method are disclosed for the creation of augmented reality (AR) experience enabling physical (e.g., real world) objects, including but not limited to, two-dimensional paintings or drawings, or three-dimensional objects such as buildings, statues and sculptures to appear to come to life before a viewer employing the disclosed AR system. The AR is experienced through a portable viewing device such as, but not limited to, a tablet, smart phone, goggles or glasses, all of which comprise an on-board microprocessor (e.g., a central processing unit, CPU) and/or a graphical processing unit (GPU), coupled to a digital memory. A computer program (e.g., application) comprising software to create the AR experience according to some embodiments of this disclosure is stored in the memory and executed by the on-board microprocessor. The software comprises machine vision to visually sense the environment surrounding the user, and image recognition algorithms to identify real world objects for which AR experiences have been created and stored in memory storage accessed by the AR application. In some embodiments, the AR application is stored in memory on the portable device. In some embodiments, the AR application is stored on a remote computer or server that is networked to the portable device. For example, the AR application may be stored on a network server in a local area network using wireless protocols such as Bluetooth and/or WiFi.

According to some embodiments of the disclosure, the portable device comprises a graphical display. In some embodiments, the graphical display comprises tactile sensors, such as a touch screen or buttons, that are coupled to the AR software stored in the memory of the portable device. According to some embodiments of the disclosure, the portable device comprises communication hardware to enable the AR software to be in wireless communication with a remote server, such as a WiFi and/or a Bluetooth adapter. According to some embodiments of the disclosure, the system and method enable creation of an immersive three-dimensional (3D) AR experience that is triggered by machine vision recognition of a real world object, such as an art tableau, a photograph, or a 3D object. In some embodiments, the 3D AR experience may be triggered by machine vision recognition of digital media displayed on a screen or as a print.

The disclosed system and method enables a user to inject multi-media content into an AR environment triggered by the real world object. In some embodiments, a portable device such as a smart phone or a tablet comprising a touch screen may be employed by a user to view the real world object. In alternate embodiments, the user views the real world object through a head-worn device, such as virtual reality or augmented reality goggles or glasses.

In some embodiments, the on-board AR application comprises machine vision software, and may receive a video data stream captured by a video camera coupled to the portable device. In some embodiments, the on-board AR application comprises image recognition software (henceforth referred to as an image recognition engine) that analyzes selected frames of the incoming video stream in real time. Image recognition software within the on-board AR application may be programmed to scan each frame for a particular object. As an example, the image recognition software may search for an art tableau on a wall before the user. The real-world object may be any suitable two-dimensional or three-dimensional object, including, but not limited to, two-dimensional works of art such as art tableaus (e.g., paintings, including murals, photographs, pattern prints), three-dimensional sculptures, automobiles, buildings, cityscapes, landscapes, skylines and the like. Each frame of a video stream generated by a video camera on the portable device may be analyzed in real time to determine if a recognizable tableau is within the frame. The software may analyze any number of rectangular objects comprising patterns of colors and/or shapes that are compared to image patterns stored in a database that is accessed by the image recognition engine.

If the image recognition engine finds a match to a pre-programmed image, the position of the real world object relative to the portable device is determined in three-dimensional space. Specifically, Cartesian coordinates (e.g., comprising sets of x,y,z coordinates) of the real world object in 3D space (relative to the portable device) may be calculated. Anchor coordinates may be determined by the application for superimposing AR objects over the real world object within the display surface of the portable device. The anchor coordinates may be a subset of the calculated Cartesian coordinates determined by the image recognition engine. For example, the anchor coordinates may be a single x,y,z point on the real world object at a suitable location, such as the lower left-hand corner of an art tableau. The application may call upon a user interaction engine to superimpose a play icon or similar touch-sensitive image over the real-world object (e.g., the art tableau).

In some embodiments, the user is then invited to tap the viewing screen of the portable device to activate the play icon or similar touch-sensitive image that is anchored to and superimposed over the real-world object in the viewing screen. In some embodiments, the user is wearing goggles and may tap the goggles or makes a gesture that is recognized the on-board application as a desire on the part of the user to move to the next step in the disclosed AR method. By doing so, the user interface engine may direct the on-board application to display one or more blank virtual canvases in the form of virtual interactive surface superimposed over the real world object, or in proximity of the real world object. The user may direct digital content to be displayed in one or more of the virtual interactive surface by selection of digital media presented to the user by the on-board AR application. The on-board AR application may display a menu or file selection surface on the viewing screen, showing potential digital content for the user to select to be placed into the viewing screen and anchor to the real-world object. In some embodiments, the digital AR content may be two-dimensional video content comprising story-telling animations, filmed scenes, documentary style video clips, to name a few, telling a story related to the real-world object.

In some embodiments, user-selected AR content is displayed as two-dimensional video media in one or more of the virtual interactive surface anchored to the real world object. As an example, the selected AR content may be an animation of a historical figure that is the subject of an image, such as a painting or photograph comprising the historical figure. The animation may tell the life story of the historical figure, or recount one or more accomplishments attributed to the historical figure. In some embodiments, the historical figure may appear to move out of the confines of the two-dimensional image (e.g., a tableau), or remain within it. A secondary video scene may be displayed simultaneously with the historical figure, serving as a changing background. In some embodiments, the user views the projection of the historical figure (and the background in some embodiments) off-axis from the front of the image to visualize the three-dimensional projection of the figure into the space in front of the real world image or tableau.

In some embodiments, still 3D AR images are projected from the two-dimensional image. As an example, the real world object may be a flat tableau portraying a two-dimensional image (e.g., a drawing, painting or photograph) of an animal or person as the principal subject, or in the background as a hidden or subdued component of the scene. Upon activation of the play icon, a three-dimensional rendition of the animal or person may appear to materialize in front of the tableau or move out of the surface of the tableau and hover in front of it. The 3D AR image may be viewed from a continuum of angles ranging from zero degrees (e.g., on axis) relative to the front of the real world image (e.g., normal to the surface of the real world image), to ±90° off-axis (e.g., to the right or left) of the normal of the surface of the real world image. In some embodiments, when viewed from different off-axis angles, the 3D AR projection comprises a plurality of seemingly unconnected streams of color having nebulous shapes. At a pre-designated angle that is designed into the 3D image, the streams of color converge to a 3D shape that hangs in space in the vicinity of the real world image (e.g., in front of the image). The 3D shape may be recognizable to the user as a 3D projection of the two-dimensional image.

In some embodiments, a non-planar secondary or background display surface is displayed behind the real-world object. The non-planar secondary (background) display surface may have an out-of-surface warpage, curvature or bend. A virtual background image may be displayed on the secondary surface. As an example, a virtual background video is displayed on a curved secondary surface. The virtual curved background surface may convey a more realistic feel to a moving scene, such as a flyover scene taken from a surface or drone, for example. In some embodiments, an image is displayed on a "sculpted" or "molded" virtual foreground surface (analogous to the two-dimensional virtual interactive surfaces) that is the accepted or natural three-dimensional shape of the image. As an example, a foreground display surface may be in the shape of a human face. An image of a human face may be displayed on the sculpted foreground, having features (eyes, nose, mouth, cheeks, etc.) of the face following the corresponding contours of the virtual interactive surfaces.

FIG. 1 illustrates a device network implementation of AR system 100 according to some embodiments of the disclosure. Mobile device 101 comprises a CPU and/or a GPU (not shown), image capture device 102, graphical display 103, keyboard 104 and AR software application 105. In some embodiments, mobile device 101 is a portable device such as, but not limited to, a smart phone, a tablet or head-wearable virtual reality or augmented reality goggles or glasses.

Mobile device 101 may comprise a WiFi network adapter (not shown) that enables wireless networking between mobile device 101 and remote server 106 via a wireless network (e.g., WiFi router 107) that is in direct wireless communication with remote server 106 through a WiFi protocol (or other suitable wireless protocols), or indirectly through the internet. On-board AR application (e.g., App)

105 is a software program residing in at least a portion of on-board memory 108 that is coupled to a CPU and/or a GPU 109 for execution. AR application 105 may be a client for AR engine software (e.g., AR engine 112) on remote server 106. AR application 105 may contain code that is organized into modules or engines for receiving data from image capture device 102 and displaying data representing virtual images superimposed on display screen 103 to create the augmented reality experience for user 108. Display screen 103 is a touch screen having tactile sensors coupled to the CPU or GPU for tactile input from user 108. In some embodiments, user 110 presses keys on keyboard 104 as user input to AR application 105. In some embodiments, mobile device 101 is a pair of virtual reality or augmented reality goggles or glasses worn by user 108 that comprises buttons for user 110 to press, or that records hand gestures made by user 110 as user input to AR application 105.

User 110 may point image capture device 102 at a real world object, such as tableau 109 to digitize as a video data stream comprising multiple frames. In some embodiments, tableau 111 is recorded as a single frame. It is understood that tableau 111 is representative of real-world objects, and that any real-world object may be the subject of a programmed AR experience executed by AR application 105. The video data may be processed by AR application 105, as described below. In some embodiments, video data taken by image capture device 102 is transferred to remote server 106 and processed by AR engine 112 instead of on mobile device 101. AR engine 112 may access image file storage 113 on server 106. In some embodiments, AR application 105 is a client application for AR engine 112. In some embodiments, file storage 113 is accessed remotely by AR app 105 on mobile device 101 via wireless network 100. In some embodiments, image files may be stored in cloud storage 114. In alternative embodiments, image files may be stored directly in on-board memory 108 of mobile device 101 to be accessed directly by AR application 105.

AR engine 112 on remote server 106 may comprise client recognition software that registers mobile device 101 to allow AR application 105 to access AR engine 112 and file storage 113. In implementations, real world objects, such as art tableau 111, are displayed in a commercial or private settings such as galleries, offices, shops, private homes, etc. Real world objects may be artificial structures such as buildings, houses, etc., or natural structures such as mountains, bodies of water, trees, etc.

Figure 2:
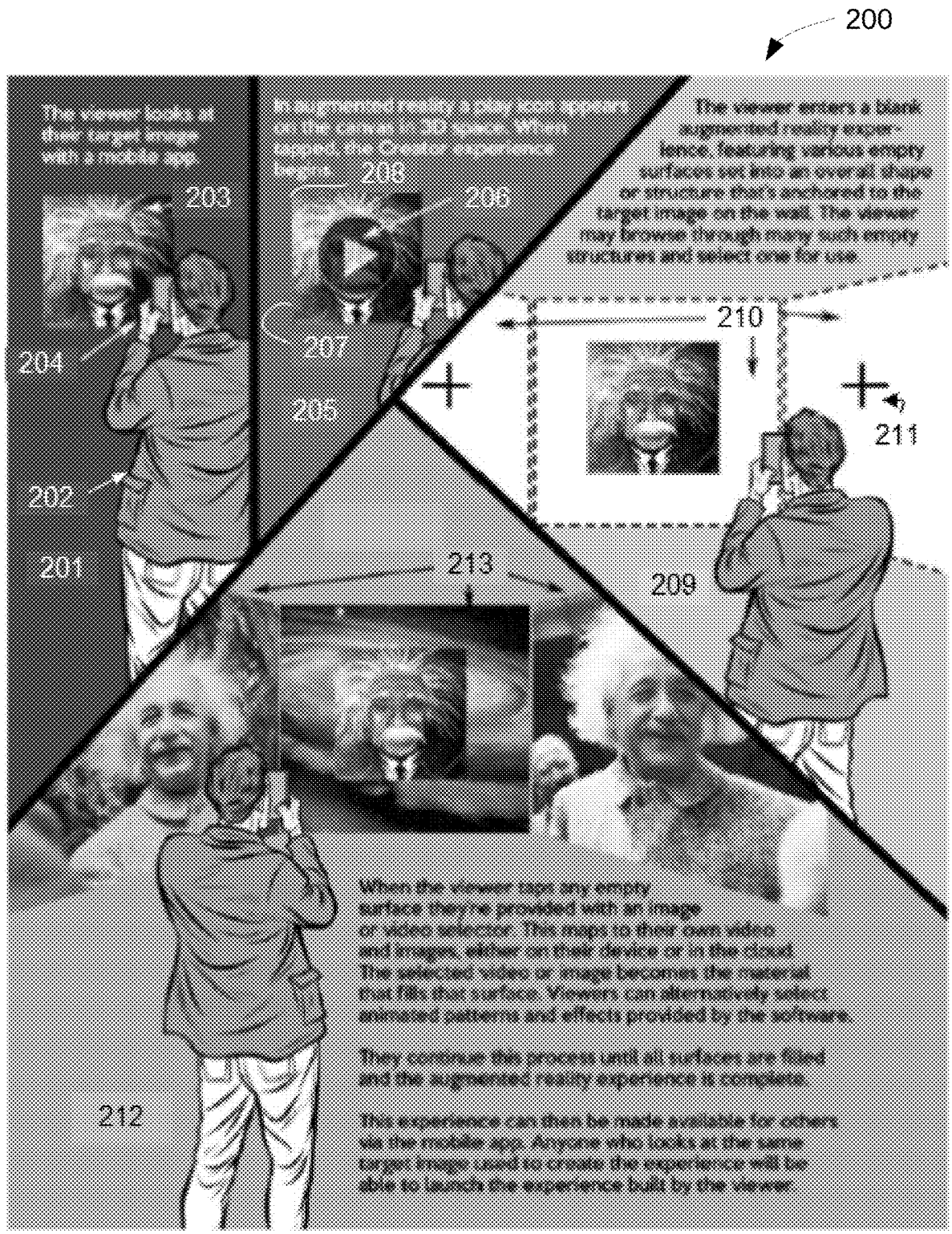
FIG. 2 illustrates an exemplary AR experience process according to some embodiments of the disclosure.

FIG. 2 illustrates an exemplary AR experience process 200 for a user according to some of the embodiments of the disclosure. Shown in surface 201 is user 202 viewing real world media 203 in its natural (e.g., unaugmented) state through portable device 204. In some embodiments, portable device 204 is a smart phone, tablet or virtual reality or augmented reality goggles or glasses. Portable device 204 may comprise an image capture device (e.g., a video/still camera), a display, and a user input mechanism such as, but not limited to, a touch screen, a keyboard or one or more button switches or a microphone/speaker for user voice input and audio communication.

Portable device 204 may comprise a microprocessor (e.g., a CPU) and/or a graphical processor (GPU) and a memory, as shown in FIG. 1. An AR application (e.g., on-board AR application 105 in FIG. 1) may be stored in the on-board memory of portable device 204. In some embodiments, the AR application is a client application that communicates with a server (e.g., remote server 106, FIG. 1) over a network (e.g., wireless network 100), FIG. 1), or is a stand-alone application that runs on portable device 204 independently of a remote server. A local area network may be implemented for portable devices such as virtual reality or augmented reality goggles, where the AR application (e.g., AR application 105) resides on a local server (not shown) in the local area network.

According to some embodiments, user 202 activates the image capture device (e.g., image capture device 105) on portable device 204, and points it at real world media 203. The image capture device (e.g., a video camera) may stream video data to a buffer within the on-board memory, and/or to a remote server. Alternatively, a single frame may be captured as a still snapshot image. The on-board AR application (e.g., AR application 105, FIG. 1) calls an image recognition engine, either self-contained within the AR application or on the remote server. The image recognition engine may search the video stream data frame by frame, or the single still frame, for content that resembles a rectangular object having a pattern of colors and forms. If the image recognition engine finds such an object, the captured image of the real-world object is compared to multiple image files that may be stored within the on-board memory or on the remote server in an attempt by the image recognition engine to find a match. If the image recognition engine identifies real world media 203, a match to a stored image may be found, the image recognition engine may then return control to the AR application. As an example, real world media 203 may comprise a digital print photograph or an artistic tableau of Albert Einstein, as shown in surface 201. The Image Recognition Engine Surface 205 shows an exemplary view of real-world media 203 as seen by user 202 through a display (e.g., a touch screen or goggles display) of portable device 204. When real world media 203 has been identified by the image recognition engine, the AR application may proceed to calculate the 3D coordinates of real world media 203 in Cartesian space. According to some embodiments, when the 3D coordinates of real world media 203 have been obtained, an anchor point is created for real world media 203. The anchor point may be a corner of the photograph or tableau for superposing AR objects on real world media 203. As user 202 may move around, for example to find a more convenient viewing position and angle, constantly changing the point of view, the 3D coordinates and anchor point of real world media 203 may be recalculated and constantly updated with respect to the position and viewing angle of portable device 204. As an example, a virtual interactive surfaces 207 is anchored to the calculated anchor coordinates in 3D space and may have dimensions approximating or equaling those of real world media 203 (e.g., the same size as the frame), and superimposed over real world media 203. In the illustrated embodiment, anchor coordinates may correspond to anchor point 208 at the upper left hand corner of real world media 203. Virtual interactive surfaces 207 may not be not displayed and therefore invisible to user 202, but may enable the AR application to draw objects over real world media 203. A visual prompt 206 may be drawn as a play icon in virtual interactive surfaces 207 and anchored to real world media 203 and may be approximately or exactly the same size as real world media 203. As shown in surface 205, a visual prompt may appear in to user 202 as a play icon 206 superimposed over real world media 203, as shown in surface 205. In alternative embodiments, an audio prompt may be played to user 202.

For portable devices 204 comprising a touch screen, user 203 may tap play icon (visual prompt) 206. Alternate methods of user input may be employed in response to play icon 206, such as head movement for head-worn devices such as goggles or glasses, or detectable hand gestures. Button or keyboard input may be an alternative method of accepting user input. When user 202 is prepared to proceed to the next phase of the AR experience, the AR application is signaled by tapping play icon 206 on a touch screen or using any suitable alternative method as described above.

Surface 209 shows the display of one or more virtual interactive surfaces 209 over real world media 203 in response to user input affirming desire to proceed with the AR experience, as described above. In some embodiments, virtual interactive surfaces 210 provide a template for addition of AR objects germane to the content of real world media 203 to enable the AR experience of user 202. The AR application may place the one or more virtual interactive surfaces 210 in any geometric arrangement and shape. As an example, virtual interactive surfaces 210 are three surfaces arranged side-by-side as shown in surface 209, with the outer two surfaces appearing to be tilted out of surface relative to the middle surface to give an impression of a 3D diorama. Any other arrangement and shape of virtual interactive surfaces 210 may be employed for a desired effect. In some embodiments, the user may opt to select a different set of virtual interactive surfaces, preferring a different arrangement and/or shapes.

In some embodiments, virtual interactive surfaces 210 include visual marks or indicia 211 for inviting tapping on a touch screen, but otherwise blank. In some embodiments, tapping a touch screen anywhere within the blank virtual interactive surfaces 210 to proceed to display visual content within virtual interactive surfaces 210. The visual content may include a custom image, a slideshow, or an animation or live action video that fills at least one of the virtual interactive surfaces 2109. In some embodiments, other methods may be employed to indicate desire to proceed.

When activated by tapping within one of the blank virtual interactive surfaces 210, a video selector, file selection surface, or image is shown to user 202. As an example, a video may be selected by user 202. The selected video file is fetched by the AR application, and displayed within the selected virtual interactive surfaces 209. This is shown in surface 212. All three "screens", embodied by the three virtual interactive surfaces 209 anchored to real world media 203 in the example, have video content 213 displayed within them. The video frames of content 213 may be distorted to fit within the boundaries of the virtual interactive surfaces 210, as shown in surface 212. In the illustrated example, a multidimensional story relating to Albert Einstein may be conveyed to user 202 in the AR experience enabled by the process described above. The three videos may run concurrently or in sequence.

Figure 3:
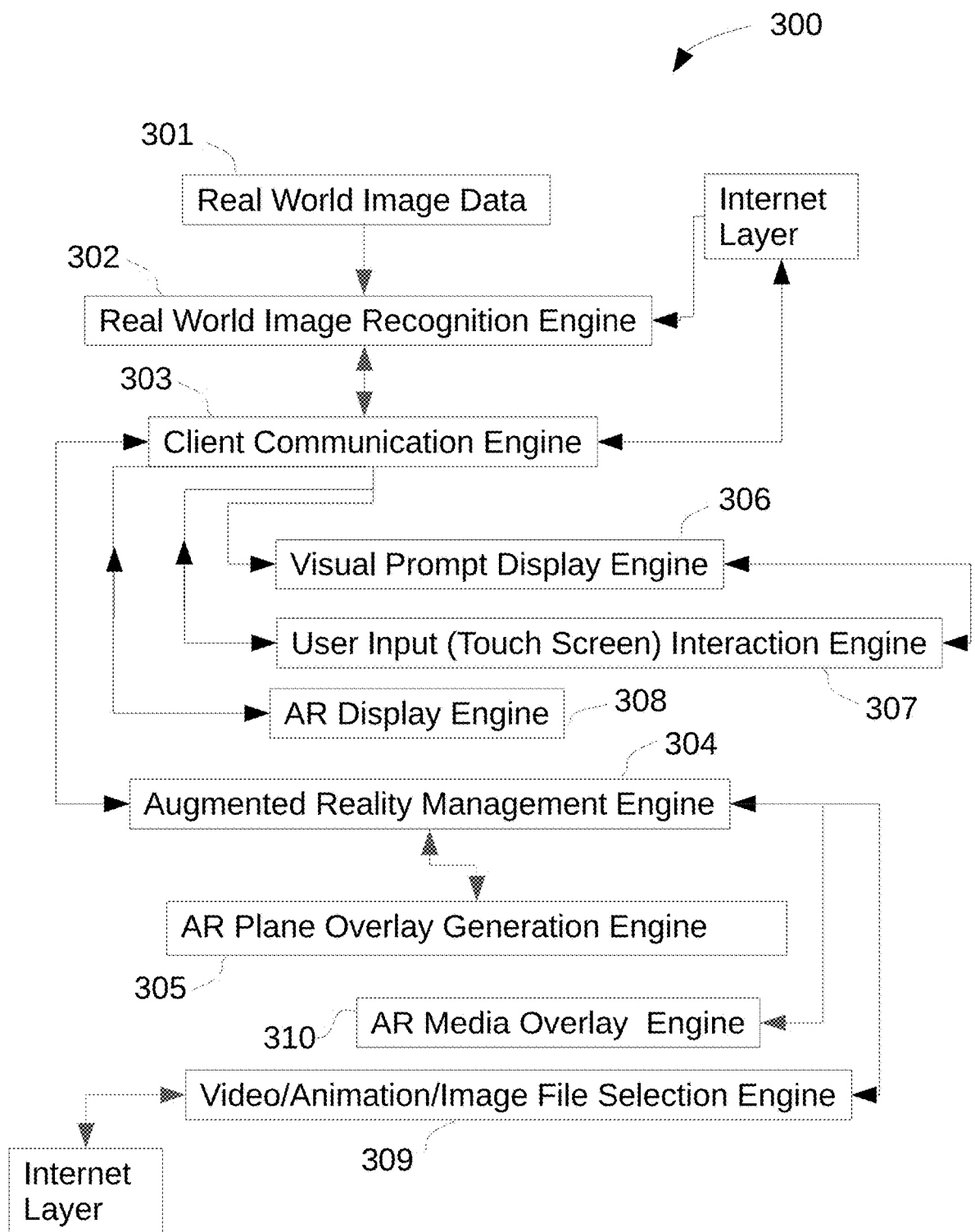
FIG. 3 illustrates a block diagram for illustration of an exemplary organization of the AR system software, according to some embodiments of the disclosure.

FIG. 3 illustrates block diagram 300 for illustration of an exemplary organization of the AR system software comprising AR application 104, FIG. 1. In some embodiments, AR system software comprises multiple principle modules, including image recognition engine 302, client communication engine 303, and Augmented Reality Management Engine 304. Client communication engine 302 may call subservient software engines, such as, but not limited to, Visual Prompt Display Engine 306, User Input Interaction Engine 305 and AR Display Engine 308. All modules may be included in the on-board memory in the portable device (e.g., portable device 104 in FIG. 1 or 203 in FIG. 2), or some of the modules may be stored on a remote server (e.g., remote server 105, FIG. 1), called by a client application on the portable device.

Real-World Image Data layer 301 may comprise an interface to portable device operating system software for commanding the image capture device hardware (e.g., on-board video camera). Data obtained by the image capture device hardware is sent to Real World Image Recognition Engine 302 from the Real World Image Data layer 301. Data may be a multi-frame video stream or single image frame. Frames may be buffered in the on-board memory of the portable device. Alternatively, video data may be streamed to the remote server. For each frame, image recognition routines that may be part of Real World Image Recognition Engine 302 may comprise algorithms that are able to scan the buffered data for identifiable images, by comparison to image files that are stored in the on board memory (e.g., on the portable device) or in a memory on the remote server accessed through internet layer 310.

Once an identification of the real-world object is made by finding a match between the real world object and an image stored by the application, as being recognized by the AR application as a trigger for an immersive AR experience. 3D Cartesian coordinates may be calculated by routines within Real World Image Recognition Engine 302. In alternative embodiments, 3D coordinates of the real world object may be calculated by a separate software engine. 3D coordinates of the real world object may be constantly updated as the user may move around and may view the real world object from different angles.

Once an identification is made by finding a match between the real world object and an image stored by the application, program control is passed to Client Communication Engine 303. In some embodiments, Client Communication Engine 303 may call on routines in the Visual Prompt Display Engine 306 to create a play icon for display over the view of the real-world object (e.g., play icon 206, FIG. 2), which returns control to Client Communication Engine 303 after its task is completed, which may call routines in User Input Interaction Engine 307 to wait for the user to tap the icon on a touch screen. Visual Prompt Display Engine 306 may continue to obtain updated 3D coordinates of the real-world object from Augmented Reality Management Engine 304, for example, to continue to retain adhesion of the play icon to the real-world object within the viewing screen of the portable device.

In some embodiments, Visual Prompt Display Engine 306 may create other prompts for the user, including audible prompts. A sound may be emitted from the portable device loudspeaker, or a generated voice may speak to the user to invite user input. The user may speak to the portable device to affirm or negate desire to continue with the AR experience at that point in time during the AR experience. In some embodiments, the user may press keys on a keyboard, either soft or physical. In some embodiments, visual prompt may be generated in the context of virtual reality or augmented reality goggles or glasses, where a user response may be accepted in multiple ways. The user may tap the goggles over the icon, or gesture by nodding the head, or press a button, as an example. The user responses may be detected by User Input Interaction Engine 307, which may communicate with drivers that interface with a touch screen, keyboard or motion sensors.

Once affirmative user input is received by User Input Interaction Engine 307, the icon may disappear and the application then displays a blank virtual template over the real world object. As an example, the blank template may comprise the virtual interactive surfaces 209 shown in FIG. 2. A default template may initially appear that has been pre-programmed for a particular target real world object. In some embodiments, a template selection surface or palette may appear in the display for giving the user the opportunity to choose another template. The template display data may be managed by Augmented Reality Management Engine 304, which may pass program control to the AR Surface Overlay Engine to generate and display the template. As an example, in concert with Client Communication Engine 303, Augmented Reality Management Engine 304 may access User Input Interaction Engine 307 to monitor touch screen positions of virtual interactive surface 209 for a second tactile response from the user. [other kinds of user input here]

User input (e.g., tapping one of the virtual interactive surface on the display to select it) may be managed by User Input Interaction Engine 307. Control may be returned to Augmented Reality Management Engine 304 at this point in the program flow, which maps the user touch screen (or other) input to the selected virtual interactive surfaces. The AR Surface Overlay Engine 305 may be called from Augmented Reality Management Engine 304 to overlay default content within the selected virtual interactive surfaces, as shown in surface 211 of FIG. 2. The default content may be any of a video clip, slide show or still image. In some embodiments, Augmented Reality Management Engine 304 may call Video/Animation/Image File Selection Engine 309 to load content from a media file that may be stored on the portable device or on a remote server, which may be accessed through the internet layer. The media file may be a default file chosen randomly by engine 309. In some embodiments, the user may tap the virtual interactive surfaces once more to prompt a display of a file selection surface for choosing another type of media content to be displayed within the virtual interactive surfaces.

If multiple virtual interactive surface are displayed in the blank template, such as shown in surface 208 of FIG. 2, the user may tap the remaining virtual interactive surface (e.g., virtual interactive surface 209) to load similar content into each.

Figure 4:
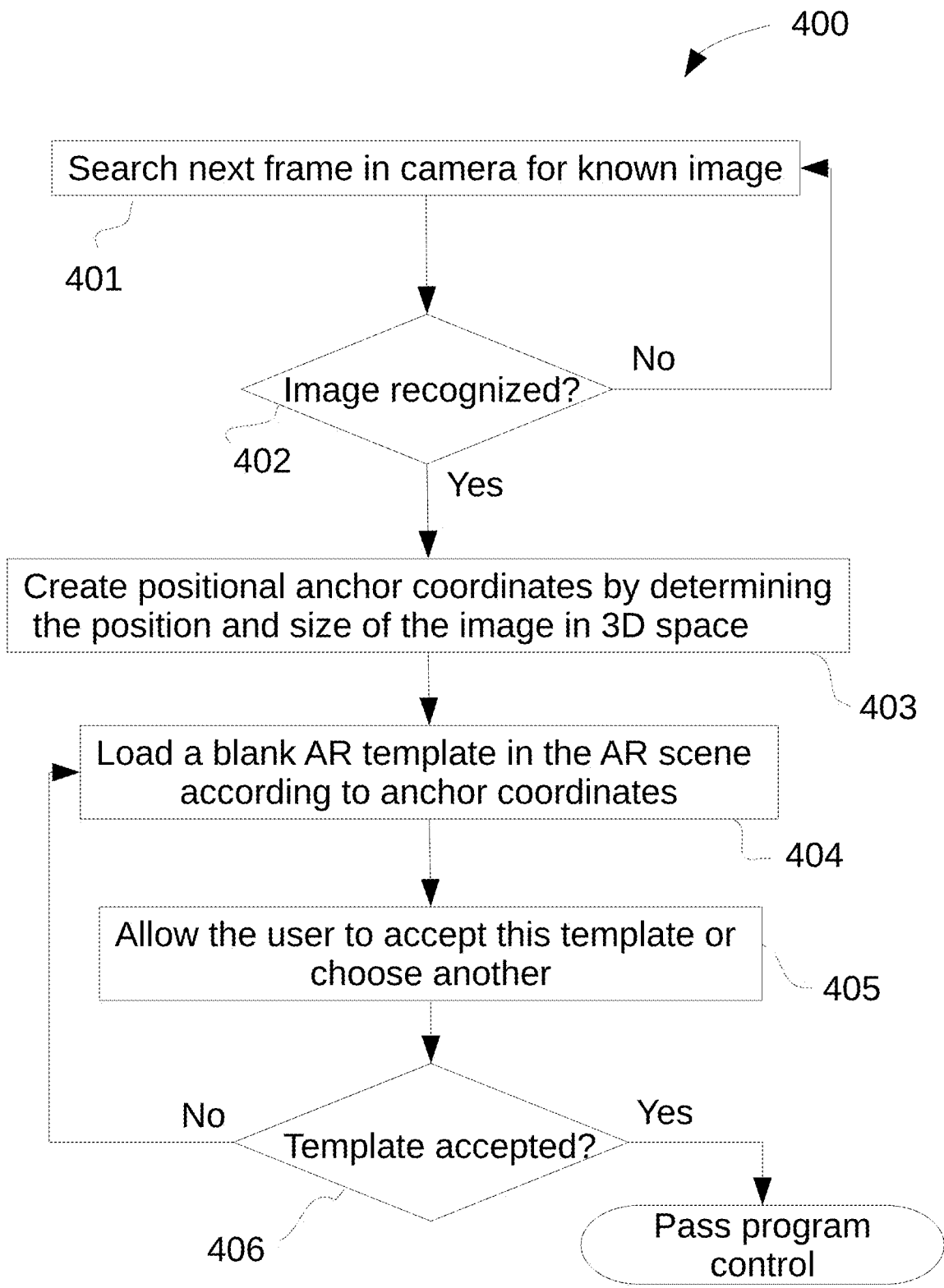
FIG. 4 illustrates an exemplary block diagram for an Image Recognition Engine block of the AR application software program flow chart in FIG. 3, according to some embodiments of the disclosure.

FIG. 4 illustrates an exemplary block 400 for Image Recognition Engine 302 block of the AR application software flowchart in FIG. 3, according to some embodiments of the disclosure. Image Recognition Engine 302 may comprise several subroutines, such as the blocks shown in FIG. 4. When AR application (e.g., AR Application 105, FIG. 1) stored on the mobile device (e.g., mobile device 101, FIG. 1) passes control to the Real World Image Recognition Engine (e.g., block 302, FIG. 3), data is received and buffered as a multi-frame video stream or as a single frame image from the image capture device, such as the device video camera (e.g., image capture device 102, FIG. 1). The Image Recognition Engine may access a portion of on-board memory (e.g., RAM 108, FIG. 1) for buffering the video data, or access memory on a remote server (e.g., remote server 106, FIG. 1) through the internet layer of the application (e.g., see FIG. 3). If a remote server is shown, the data is sent wirelessly to the server, according to some embodiments of the disclosure. An exemplary wireless network connecting the portable device to a remote server is described in FIG. 1.

In some embodiments, the Real World Image Recognition Engine (e.g., block 302, FIG. 3) comprises algorithms that employ artificial intelligence to scan each frame of a video stream, or a single frame of the still image, for recognition of, for example, "tableau" type objects that are rectangular and two-dimensional (e.g., flat) objects comprising an image within the plurality of random real world objects that are captured in the frame. Moreover, multiple real world tableaus may be present in the frame. The recognition algorithms may scan each real world object that appears to be a tableau for color and shape patterns, and when a color and/or shape pattern is detected, the algorithm may perform a comparison to a library of tableau image files stored in the local memory or on the remote server.

The library of tableaus stored in the application memory may be digital or digitized media (e.g., hand-drawn CAD images, digital photos, digitized photographs) that are pre-assembled into a library of images by a public, commercial or private artist, gallery, educational institution or other entity that desires to present an enhanced viewing of chosen artistic and photographic images, or for educational pursuits by providing images in the form of two-dimensional tableaus or 3D media for viewers to experience an augmented viewing through the AR system and method embodiments disclosed herein.

The Image Recognition Engine may perform the image search within a conditional loop. For each candidate real world object scanned, control is passed to decision block 402 to direct control to the next program block (e.g., block 403) if an identification of a real world tableau is made, or return to the search algorithm (e.g., block 401).

Once an identification has been made, program control is passed to block 403, where the 3D coordinates of the real world tableau are calculated. Subroutines in block 403 may call upon subroutines in another engine to calculate 3D coordinates of the real world tableau. As an example, the physical dimensions of the real world tableau may be stored in the application, and recalled to determine the distance from the user (e.g., specifically the portable device) to the tableau. As an example, the relative size of the tableau within the field of the viewing frame of the camera may be a parameter for calculation of distance, taking into account the camera magnification. As an example, a tableau may have dimensions of 50 cm×30 cm. If the dimensions are stored as metadata for the image file, then the engine may call upon algorithms that perform geometric determination of the perspective of the tableau within the viewing field of the camera at a particular magnification to find the distance between the user and the tableau.

Three-dimensional x,y,z Cartesian coordinates of the real world tableau relative to the viewing field of the camera may be obtained by specialized algorithms. As the user moves and changes distance and/or viewing angle, the coordinates are updated. The Image Recognition Engine may comprise a monitoring routine that keeps track of the shape of the tableau on a periodic basis. For example, if the user moves to side, the view of the tableau is distorted to produce an asymmetric shape, or a trapezoidal shape (albeit rotated approximately 90°), where one vertical edge (e.g., a proximal edge) appears to be longer than the second vertical edge (e.g., a distal edge). The viewing angle may be calculated from these measurements, and the relative coordinates may be recalculated.

Algorithms called by block 403 may determine a set of 3D anchor coordinates on the real world tableau based on the calculated 3D coordinates. Once an anchor point is determined for the real-world tableau, a blank virtual interactive surfaces template is displayed on the viewing screen of the portable device at the anchor point by subroutines in block 404. The template appears to be anchored to the tableau, and moves its position and angle with it as the anchor point is constantly updated. Block 405 may contain code that redirects program control to block 404 of the application, and comprise a conditional loop that is represented by decision block 406 to allow the user to choose another template if not satisfied with the current one displayed. In some embodiments, decision block 406 may loop back to block 404, and automatically redraw the template over the real world tableau. If the user is not satisfied with the next template, the user may prompt the program to display another template by tapping on an indicated icon or virtual button on the touch screen. In some embodiments, a palette or selection surface is presented to the user, showing the user the different template choice offered. The user may then choose the template directly.

Figure 5A:
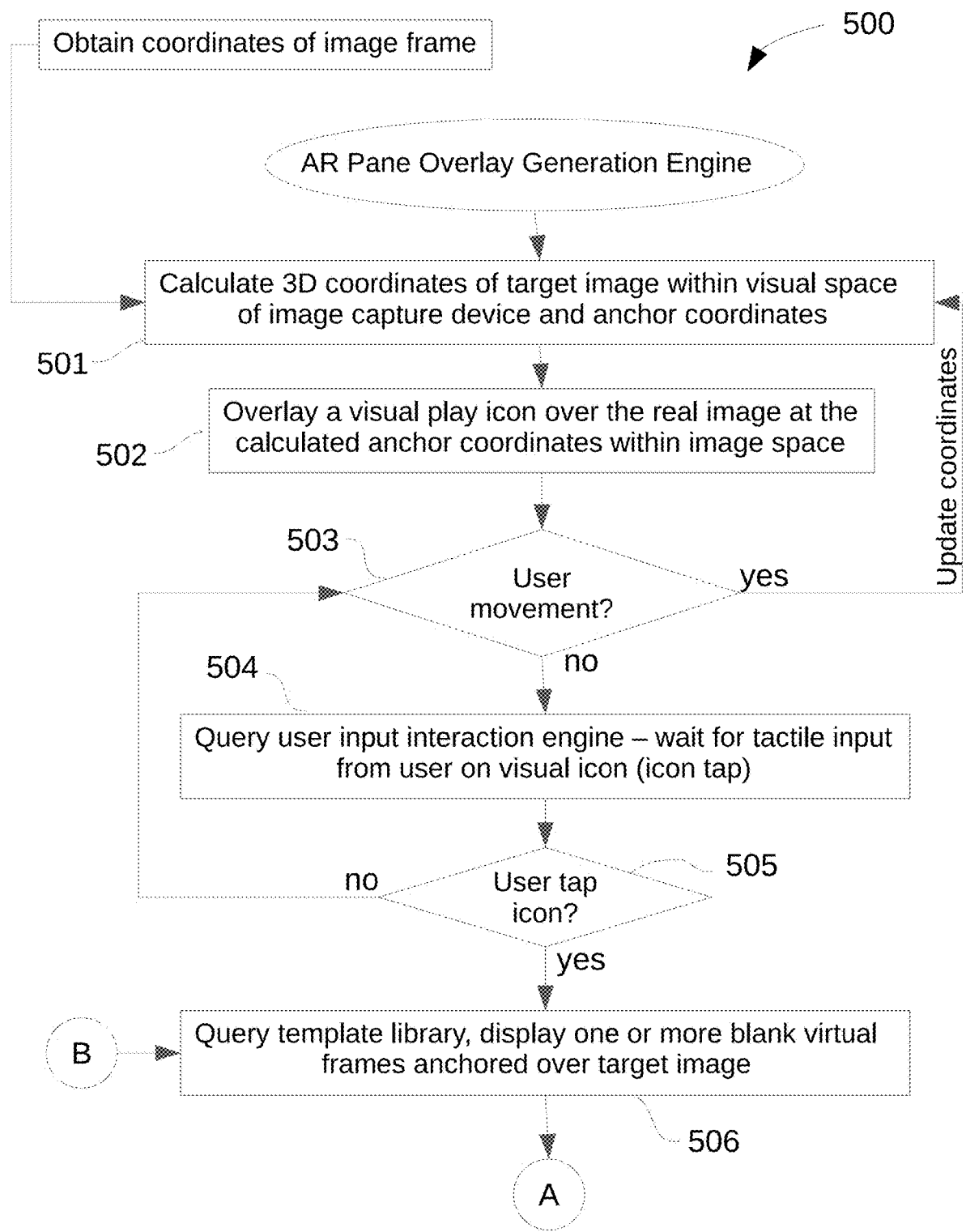
FIG. 5A-5B illustrate an exemplary block diagram for an aR Surface Generation Engine block of the AR application software program flow chart in FIG. 3, according to some embodiments of the disclosure.
Figure 5B:
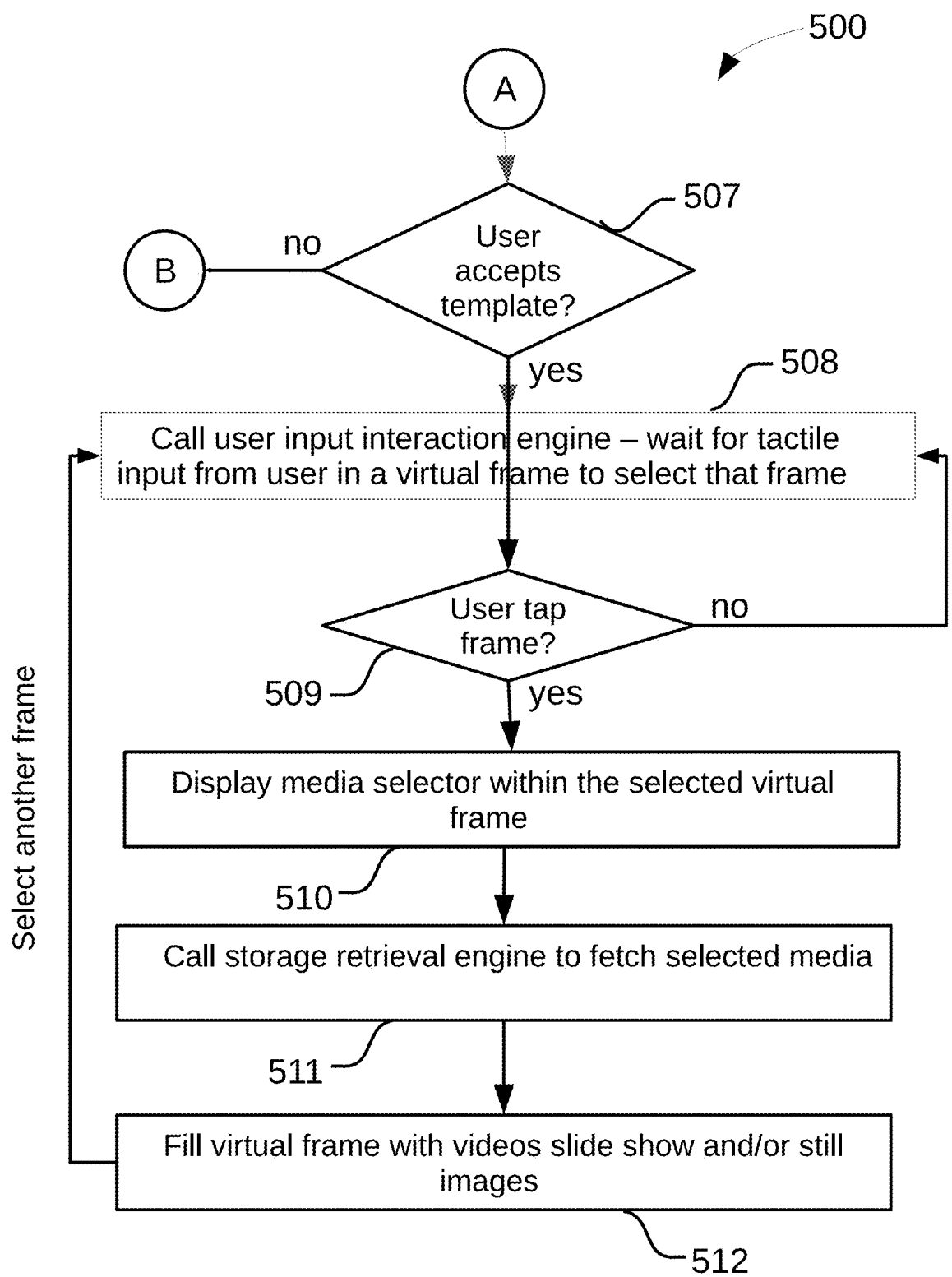

Once the template is chosen, the user may select the content to place within the virtual interactive surface of the template. FIGS. 5A and 5B illustrate an exemplary program flow chart 500 for the AR Surface Generation Engine (e.g., block 305, FIG. 3). As described above for FIGS. 3 and 4, 3D coordinates of the real world tableau (or other target real world object) may be continually updated by algorithms contained within the Image Recognition Engine (e.g., block 302, FIG. 3) or in the Augmented Reality Management Engine (e.g., block 304, FIG. 3). The real world object may be continuously monitored by the image capture device (e.g., video camera) on the portable device. If the user moves the portable device to obtain a different viewing angle, or moves to a different position with respect to the real world object (e.g., tableau), the 3D Cartesian coordinates are updated. Data comprising the 3D coordinates and anchor coordinates may be stored in a variable that is available globally to the entire program, or privately to some engines and subroutines.

In some embodiments, block 501 of AR Surface Overlay Generation Engine may call image position measuring subroutines that may be within a different engine (e.g., Image Recognition Engine), or as part of a library of subroutines available to all engines. From the 3D coordinates, an anchor point for anchoring overlay AR objects on the real world tableau may be fixed. As an example, the AR Surface Overlay Generation Engine may monitor a flag register or variable when the coordinates are stable for a pre-programmed period of time, activating block 502 to overlay of a play icon placed over the real world tableau at the anchor coordinates, and waits for user input by tapping the icon.

Block 502 may call routines in Visual Prompt Display Engine (block 306, FIG. 3) to draw the icon and anchor it to the real world image anchor point. During the wait, program control may be temporarily directed to User Input Interaction Engine (e.g., block 307, FIG. 3) to respond to user input in the form of tapping the touch screen, according to some embodiments. The viewing angle or distance is continuously monitored as described above, for example by routines in the Image Recognition Engine (block 302, FIG. 3). The decision block 503 may comprise a wait loop that waits for an indication or flag clearing/setting by the User Input Interaction Engine (e.g., block 307, FIG. 3). If the position of the real world object has changed, the decision block 503 may return control of the program to block 501. If the position is stable, program control may be passed to block 504 to wait for user input. Program flow may stop at a second decision block 505, comprising a wait loop for user input.

The wait loop in block 505 may poll a flag variable or have a hardware interrupt pass program control to block 506, comprising calls to virtual interactive surfaces template drawing subroutines. While the loop continues to wait for user tactile input (e.g., tapping on the icon), a query may be made to User Input Interaction Engine (e.g., block 307, FIG. 3) for any change in the size, position or angle of the real world object in the image capture data. If a change has occurred due to movement of the portable device, 3D real world object and anchor point coordinates are updated as described above.

When the application receives input from the user in the form of a tap on the icon displayed over the real world object, a call may be made to a template library manager routine to load a default template over the real world object. As an example, subroutines in the AR surface Overlay Generation engine may call subroutines in the AR Display Engine (e.g., block 308, FIG. 3) may be called to draw a default template (e.g., template 12, FIG. 2) and anchor the template to the real world object. Referring now to FIG. 5B, program control is now passed to decision block 507, where the user is prompted to accept or reject the default template. As an example, a prompt may be displayed to query the user. A button may be displayed, or a yes/no mark or left/right arrows for the user to tap. If the user is not satisfied with the template as displayed, they may opt for another choice. If the user wishes to change the template, they indicate this desire to the program as described, program control may flow back to block 506 in FIG. 5A for choice of a different default template. In some embodiments, a file selection surface is displayed showing images of templates. The user may then choose one of these templates.

Program control may revert back to the wait loop in decision block 507 to wait for affirmative input from the user, in the form a tactile response (e.g., a tap). When user response is affirmative, and a template is chosen, program control advances to block 508. In addition to the outline of the virtual interactive surface, icons, marks or other indicia maybe displayed to invite the user to choose one virtual interactive surfaces over the others among other multiple virtual interactive surface. Another call may be made to the User Input Interaction Engine (e.g., block 307, FIG. 3) to wait for the user to select one of the virtual interactive surface. Program control is passed to decision block 509 to wait for the surface selection.

Once the user has selected a virtual interactive surfaces by tapping within a particular virtual interactive surfaces in the template, program control is passed to block 510. Routines in block 510 may call Augmented Reality Management Engine (e.g., block 304, FIG. 3), which in turn, may call the Video/Animation/Image File Selection Engine (e.g., block 309, FIG. 3) to offer to the user augmented reality content to load into the selected virtual interactive surfaces. Referring briefly to FIG. 3, block 309 may access AR content files on a remote server through the internet layer of the AR application. In some embodiments, AR content files may be the on-board memory residing on the portable device. As an example, block 309 may select a random AR video file, or a default AR video file, may be displayed within the virtual interactive surfaces selected in block 509 (FIG. 5B). The AR media content may play automatically if a AR video, for example, without a choice from the user. In some embodiments, a menu or selection surface is displayed to the user to allow user selection of a particular AR video, animation or image. The user may then actively select a particular AR video, animation or image.

The AR file may be fetched from on-board memory or server memory in block 511. Routines in block 512 may call subroutines in the AR Media Overlay Engine (e.g., block 310, FIG. 3) and/or AR Display Engine (e.g., block 308, FIG. 3) to overlay video or other content into the selected virtual interactive surfaces.

Figure 6:
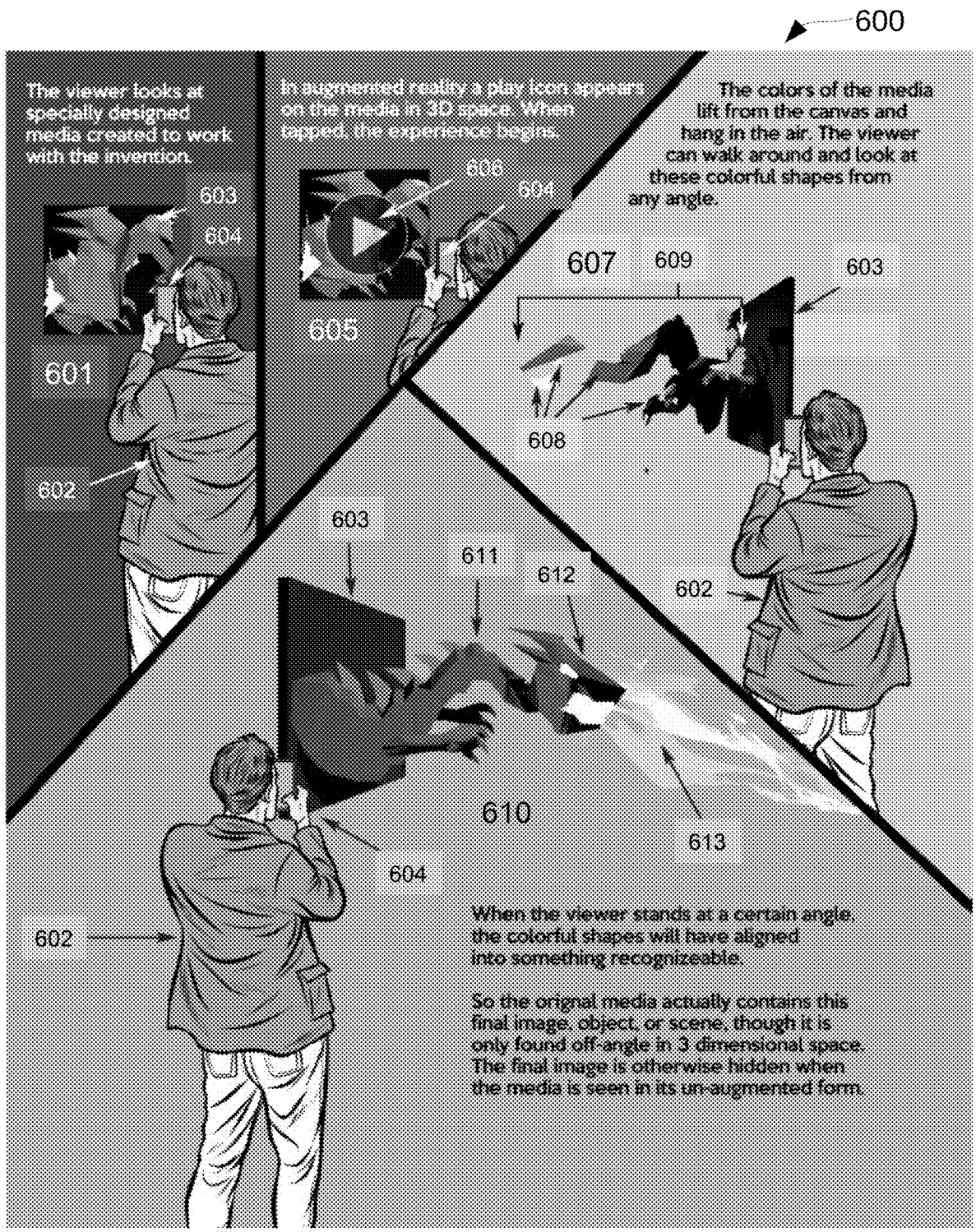
FIG. 6 illustrates an AR user experience by viewing a 3D AR object off-angle, according to some embodiments of the disclosure.

FIG. 6 illustrates an augmented reality user experience 600 by viewing a 3D AR object off angle to experience a hidden object not visible in an un-augmented real world object as viewed in the portable device. In the embodiment illustrated in FIG. 6, wherein in surface 601 user 602 finds a real world tableau 603 through an image capture device (e.g., a video camera) on portable device 604. In some embodiments, real world tableau 603 is specially drawn as a two-dimensional painting or drawing to provide the basis of a programmed 3D AR experience.

User 602 points portable device 604 at real world tableau 603, having activated an AR application in portable device 604. The AR application may activate the video camera on portable device 604 to capture the viewing field as a video stream. The video data may be processed as described above to search for identifiable objects (e.g., FIGS. 3, 4 5A and 5B). In surface 605, real world tableau 603 has been recognized by the AR application on portable device 604. As an example, the AR application may superimpose play icon 606 by calling routines in the Visual Prompt Display Engine (e.g., block 306, FIG. 3), according to anchor coordinates calculated by block Real World Image Recognition Engine (e.g., block 302, FIG. 3). In surface 605, play icon 606 is superimposed over real world tableau 603.

Referring again to FIG. 6, surface 607 shows that user 602 has tapped the play icon (e.g., play icon 606) to initiate the AR experience. From the vantage point of user 602 viewing real world tableau 603 through portable device 604, multiple AR objects 608 appear to emerge from the surface of real world tableau 603 and enter the 3D space before real world tableau 603. In some embodiments, the two-dimensional drawing on real world tableau 603 appears to move out of the surface of the tableau as an animated 3D intact rendering of the two dimensional rendering on the tableau. When viewed face on, that is, when user 602 is standing or sitting substantially directly in front of real world tableau 603, the viewing angle is substantially zero degrees. In surface 607, user 602 is shown standing to the side of real world tableau 603, at a viewing angle of substantially 90°. In the illustrated embodiment, the viewing angle of user 602 reveals an apparently disconnected array of 3D objects 608 suspended in the space immediately in front of real world tableau 603, forming a 3D object ensemble 609. The 3D object ensemble 609 may appear to user 602 to contain no recognizable pattern or connection between the disparate objects suspended in space.

In surface 610, user 602 has moved viewing position to view 3D objects 608 from a different angle. In the illustrated embodiment, the viewing angle has been programmed to enable an alignment of apparently disparate objects 608 to form a recognizable 3D image 611, which is a dragon in the illustrated embodiment. As user 602 moves toward the target angle, an image, shape or scene begins to take shape and become recognizable. According to some embodiments of the disclosure, the closer user 602 approaches the target angle, the more the 3D image 611 appears as intended. In some embodiments, 3D image 611 is a revealed hidden image not visible in the flat artwork, or when real world tableau 603 is viewed from substantially any other angle.

In some embodiments, 3D objects 608 may appear as slices, slivers and particles of color that expand into the air. In some embodiments, the media is stretched forward in such a way as to mask the greatness of its depth so that the front-most angle (e.g., zero degrees) remains nearly identical to the original flat media. In some embodiments, user 602 is prompted to move around and view real world tableau 603 from different angles. Viewing the space in front of real world tableau 603 from many angles, user 602 may observe a three-dimensional pattern of 3D shapes that compose 3D objects 608, which may seem to be physically separate and randomly configured in an incoherent pattern. In some embodiments, 3D objects 608 may appear to be extruded streamers and ribbons that have curvature and/or comprise substantially straight portions. Some of objects 608 may comprise branches and offshoots, as shown in surface 610. The 3D shapes may have a single color, or have multiple colors. The colors may be the same colors observed in real world tableau 603.

At a target viewing angle, user 602 views a recognizable object, such as the dragon (e.g., 3D image 611) shown in surface 610. In some embodiments, the AR application comprises algorithms to draw a 3D representation of a two-dimensional scene or particular object displayed on real world tableau 603. As an example, the virtual dragon shown in surface 610 may be first created in a 3D CAD program. Once the full 3D rendering of the virtual dragon is drawn, it may be rotated in virtual 3D space to a desired angle, showing the dragon from the side. The three-dimensional dragon may be decimated into random parts by deleting parts of 3D image 611 (e.g., the dragon) and retaining non-deleted parts as separate objects. For example, the head of the dragon may be isolated by deleting the body of the dragon. Moreover, any solid 3D shape of the dragon may be made into a 3D surface (e.g., a shell) by retaining the three-dimensional surface coordinates, while interior points are eliminated. The 3D surface (shell) representation of the dragon may be decimated into pieces so that only the surface contours of the dragon are displayed as an ensemble of slices, slivers, and particles of color, as shown as the ensemble of 3D objects 608 in surface 607. When viewed in 3D space from random angles, user 602 may see what appear to be an ensemble of pieces of broken shell of a hollow object (e.g., 3D objects 608). The ensemble of 3D objects 608 may appear to user 602 as a three-dimensional display of abstract art. The experience of viewing the shell pieces hanging in space enhance a coherent view of the ensemble of 3D objects 608 from only a unique direction, as shown in surface 609 when user 602 has moved position and viewing angle to observe the dragon (e.g., 3D image 611) intact. As user 602 moves to the target angle, the 3D objects 608 converge to the target 3D image 611, in this example the ensemble of 3D objects 608 converge to a dragon shape. User 602 may observe a gradual coalescence of 3D objects 608 to a target shape when moving around real world tableau 603 to search for the target viewing angle.

In some embodiments, 3D object 611 may become animated when user 602 is prompted to initiate a pre-programmed animation sequence. As an example, user 602 may be prompted to tap the head 612 of the dragon. As shown in surface 609, the dragon appears to be breathing fire 613. Other effects may be produced in a similar manner. As a further example, user 602 may be prompted to tap the touch screen or gesture with VR goggles or glasses, to make 3D object 611 come to life. User 602 may initiate an animation of 3D object 611 by tapping over a portion of or anywhere on 3D object 611. 3D object 611 may appear to make sounds, or to speak to user 602. For example, an animation sequence may be initiated where the dragon introduces itself and tells a story to user 602.

Figure 7:
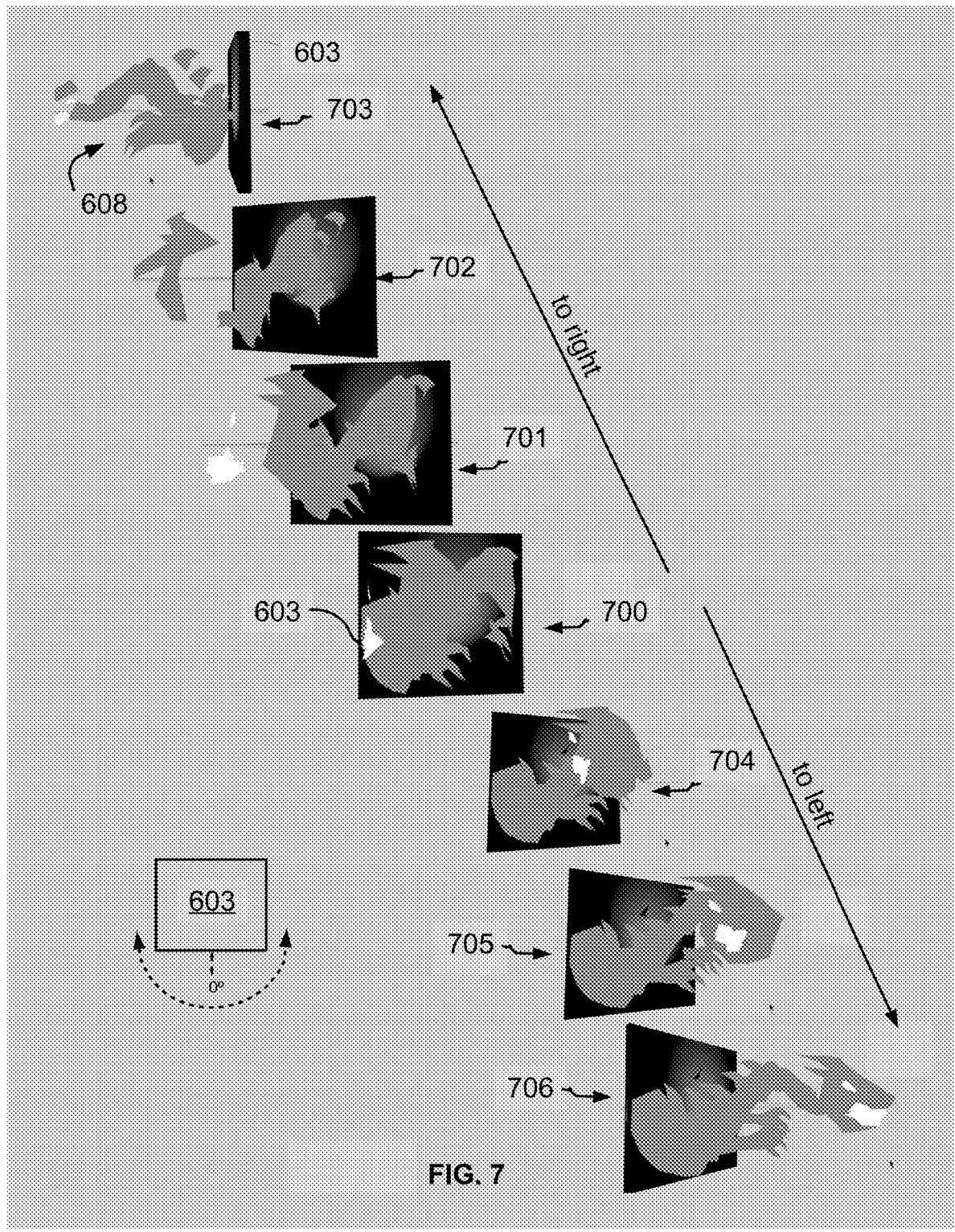
FIG. 7 illustrates an exemplary progression of views of a plurality of 3D objects from a progression of viewing angles, according to some embodiments of the disclosure.

FIG. 7 illustrates an exemplary progression of views 700-706 of 3D objects 608 as may be viewed from a progression of angles relative to the zero degree viewing angle 700, normal to the surface of real world tableau 603. Views 700-706 may represent content that user 602 may see when positioned at a progression of angles along an arc encircling real world tableau 603. View 700 is representative of viewing 3D objects 608 while positioned directly in front of real world tableau 603. The array of 3D objects appears to be a projection of the two-dimensional image, as seen on real world tableau 603, onto a surface between user 602 and tableau 603. When expanded forward from the surface of the tableau, the ensemble of 3D objects 608 look substantially identical to the view on the flat media, when viewed from zero degrees, neglecting the increase in size due to closer proximity to the user.

Progressing from center to the right from view 700 to views 701, 702 and 703, the user may walk around the tableau to the right side (e.g., view 703). The user may first see the flat media as if no AR experience is occurring. As the user progresses to the right, 3D objects 608 appear to begin to emerge from the tableau in view 701. The ensemble of 3D objects 608 may appear as an ensemble of separated, non-contiguous shapes and colors that project from the originally flat media as they hang in space. Continuing to move to the right of real world tableau 603 and encountering views 702 and 703, the ensemble of 3D objects 608 may appear to form continuously changing random shapes that do not form a recognizable pattern.

The inset in FIG. 7 is an aid to navigating the progression of angles about real world tableau 603. The double-arrowed curved dashed line indicates a range of view angles that the user may assume when moving from one side of real-world tableau 603 to the opposite side. In the example, the view angle is referenced to the normal to the two-dimensional plane of real-world tableau 603. In some embodiments, the view angle is referenced to the normal of a virtual interactive surface (e.g., virtual interactive surface 208, FIG. 2) that is superimposed on real-world tableau 603. The reference angle of the normal is zero degrees. This represents a user standing directly in front of real-world tableau 603. View 700 represents the un-augmented image on real-world tableau, as seen without the aid of a portable device. The double-arrowed curved dashed line in the inset indicates the user moving from −90° to +90°, or from the extreme left to the extreme right of plane of real-world tableau 603. The images labelled 700-706 show the appearance of 3D objects 608 to the user at representative viewing angles. At a target angle, 3D objects appear to align to be contiguous shape that may be recognized by the user.

Progressing from center to the left from view 700 to views 704. 705 and 706, the ensemble of 3D objects 608 begin to converge to a recognizable form. At view 706, the target angle is reached, and the view of 3D objects 608 reveals the dragon. The distribution of 3D objects 608 is configured to produce the effect of the user finding the target angle to obtain the intended form. In some embodiments, 3D objects 608 are an ensemble of surfaces, such as shell pieces, or an ensemble of solid objects as they appear to the user through the display of the portable device.

Figure 8:
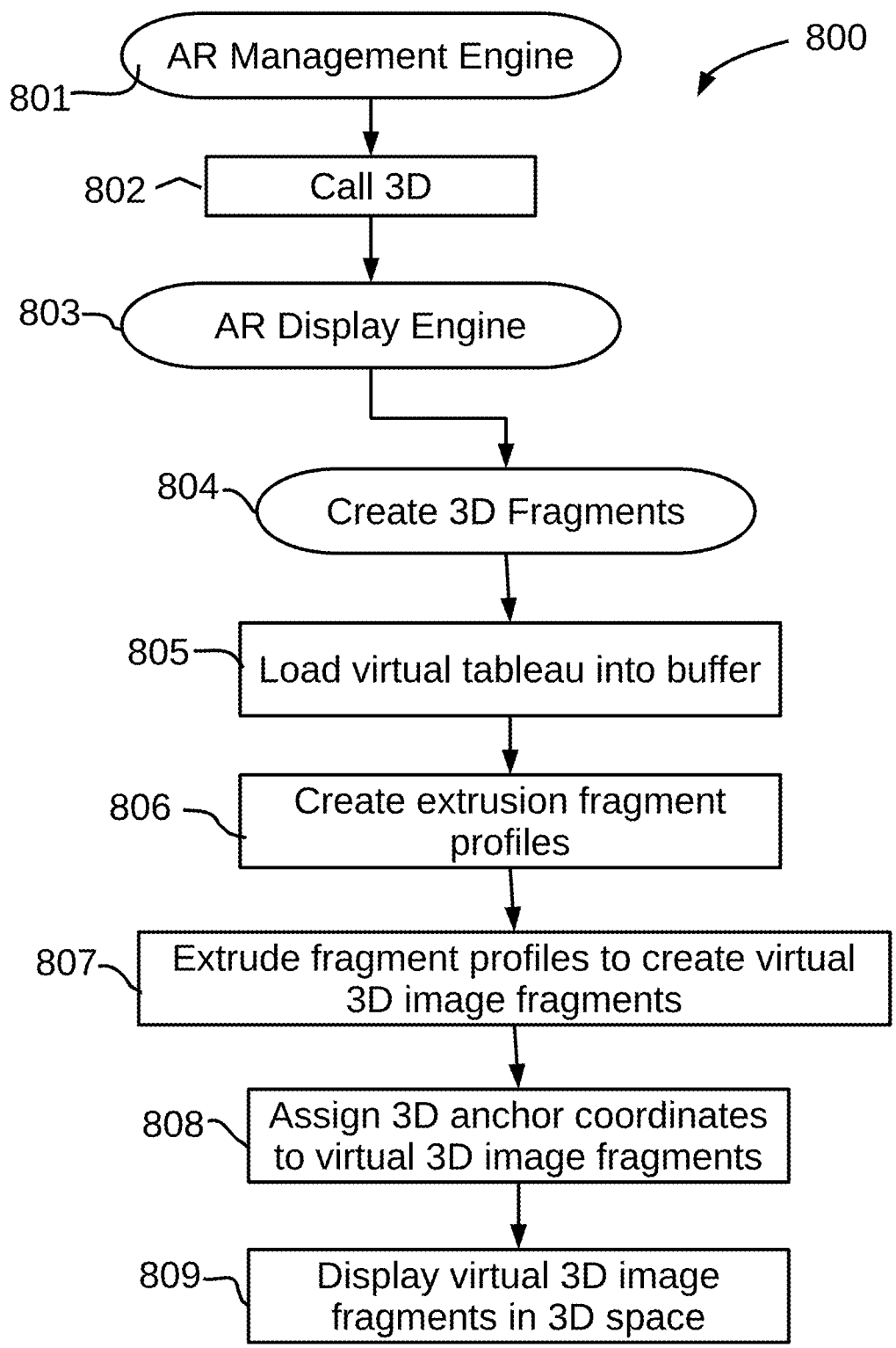
FIG. 8 illustrates an exemplary block diagram program flow chart for creation of a 3D image shown in FIG. 6, according to some embodiments of the disclosure.

FIG. 8 illustrates an exemplary program flow chart for a creation of the 3D image 610 shown in FIG. 6. In block 801, AR Management Engine (e.g., block 304, FIG. 3) may issue a call to a 3D rendering subroutine in block 802. A call may be made to subroutines in block 803, invoking drawing routines in the AR Display Engine (e.g., block 308, FIG. 3). For example, the AR Display Engine may comprise routines to draw 3D objects (e.g., 3D objects 608, FIG. 6). In some embodiments, a library of 3D drawing patterns is stored as a plurality of 3D pattern files in memory (e.g., RAM 108 or remote file storage 118, FIG. 1), In some embodiments, a pre-programmed drawing pattern is stored as metadata specific to the real world object file image.

As an example, the virtual image of real world tableau 603 in FIG. 6 may have 3D pattern template stored in memory when loaded into a video buffer that is displayed on the viewing screen of the portable device. When activated by the user (e.g., user 602, FIG. 6). In block 804 of the flow diagram, AR Display Engine may call routines for drawing 3D objects 608 (FIG. 6) that may be shell fragments of 3D image 610 (e.g., the dragon), as described above. An exemplary method for creation of 3D objects based on a two-dimensional tableau will now be described. The virtual image of the real world tableau is loaded into a buffer in block 805. In block 806, a plurality of two-dimensional extrusion fragment profiles may then be drawn according to a stored preprogrammed drawing pattern or template noted above that is associated with the particular tableau.

The two-dimensional extrusion profiles may be cutouts from the two-dimensional tableau artwork, similar to pieces in a jigsaw puzzle. In some embodiments, the extrusion profiles are not contiguous, with gaps between pieces or pieces omitted. The profiles may contain the colors, lines and shapes within the boundaries of the piece. The ensemble of profiles, when assembled, form the two-dimensional image of the real world tableau, as seen by the user (e.g., real world tableau 603, FIG. 6). Creation of the 3D objects (e.g., 3D objects 608, FIG. 6) may be initiated in blocks 806 and 807. Individual profiles may be stretched, for example, to form extrusion-like objects. The extrusion path may be curved along arbitrary paths. The extrusion shapes may undulate in width along the extrusion path, or may branch. Drawing algorithms contained in AR Display Engine may draw the 3D shapes according to parameters passed to them by calling routines.

Extruded objects may appear to be slices, slivers, particles or pieces of shell, as noted above. The shapes and relative positions of each object may be predetermined. The spatial distribution of the objects may be made by assigning 3D anchor points to each object in block 808, the 3D anchor coordinates having as an origin the anchor point of the virtual image of the real world tableau. In block 809, the ensemble of 3D objects is displayed to the user in the display of the portable device. The anchor points may be updated as described above for the virtual interactive surface as the viewing angle changes, so that the ensemble of 3D objects appear to change perspective to the user. When viewed through the portable device at viewing angles that are off-angle relative to the target viewing angle, the ensemble of objects may appear in 3D space as a 3D abstract piece suspended before the real world tableau when viewed through the portable device.

Figure 9:
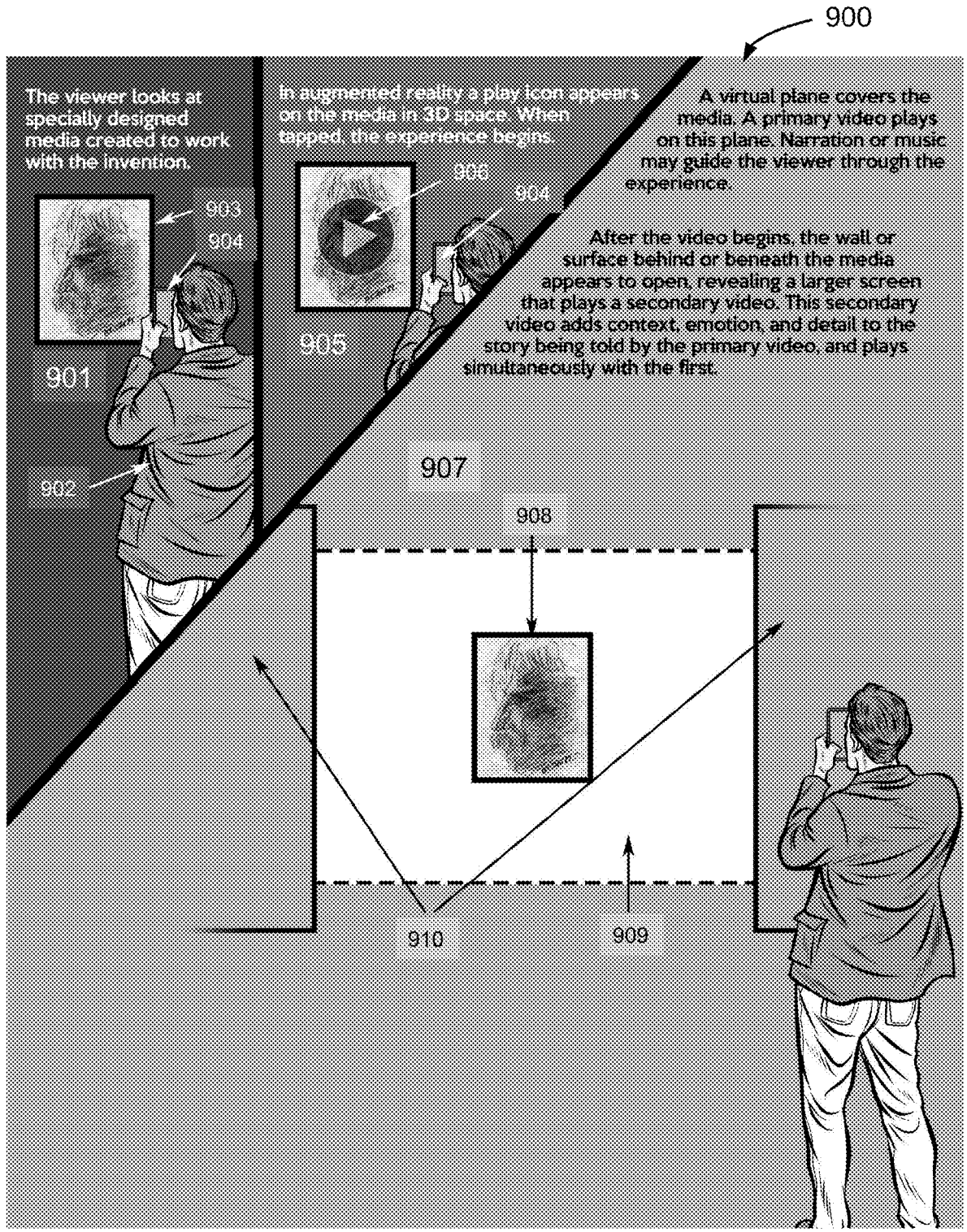
FIG. 9 illustrates an exemplary AR experience by viewing a foreground virtual real world object video and an enhanced 3D background video in a non-planar virtual interactive surfaces, according to some embodiments of the disclosure.

FIG. 9 illustrates an exemplary augmented reality user AR experience 900 by viewing a virtual real world object video and a secondary 3D background video in a non-planar virtual interactive surfaces. In surface 901, user 902 views real world tableau 903 through portable device 904. In some embodiments, portable device 904 is a smart phone or a tablet. Portable device 904 comprises an AR application (e.g., AR application 105 on portable device 101, FIG. 1). In some embodiments, portable device 904 is connected to a wireless network (e.g., wireless network 100, FIG. 1) for access to a remote server (e.g., remote server 106, FIG. 1). Real world tableau 903 may be a specially designed artwork media for an AR experience. As an example, the artwork created for real world tableau 903 comprises one or more specific components for which an AR animation is created. The animation may be a media file stored in memory on portable device 904 (e.g., RAM 108 or file storage 113, FIG. 1), and comprise an animation of the one or more components in a pre-programmed AR experience that is associated with the artwork of real world tableau 903.

In surface 905, real world tableau 903 is recognized by the AR application. In some embodiments, user 902 views play icon 906 is displayed over real world tableau by the AR application according to block 502 of AR application flowchart 500 described above. User 902 may be prompted to tap play icon 906 to activate the AR experience, as described above (e.g. see above description for FIGS. 5A and 5B). In some embodiments, user 902 wears goggles or glasses as portable device 904, which may comprise a display showing another visual prompt, or written instructions to gesture or press a button to acknowledge desire to proceed with the AR experience. In some embodiments, an audio prompt may be played to user 902. In the illustrated embodiments, portable device is a smart phone or tablet displaying play icon 906 as a visual prompt.

In the illustrated embodiment shown in surface 907, the AR experience is initiated. In some embodiments, virtual interactive surfaces 908 is anchored to real world tableau 903, and appears to overlay real world tableau 903, in a manner similar to the display of virtual interactive surface 209 in FIG. 2. In some embodiments, a virtual image of real-world tableau 903 is displayed in virtual interactive surfaces 908. A video or animation of the artwork appearing in real world tableau 903 may be launched to commence the AR experience. In some embodiments, a secondary virtual background 909 appearing to be layered behind virtual interactive surfaces 908 is shown to user 902, where secondary background 909 may be substantially larger than virtual interactive surfaces 908. In the illustrated embodiment, the AR experience 900 comprises doors 910 sliding apart to reveal secondary background 909.

A second video may start to play on secondary background 909. The second video may provide a background layer to the primary video playing in the foreground virtual interactive surfaces (not shown) anchored to real world tableau 903. The second video playing in the background may enhance visual impact and add an emotional dimension to the AR experience. The AR application (e.g., on portable device 904) plays two video files in each of the virtual interactive surface. In some embodiments, the two video files are related to the artwork displayed in real world tableau 903, having coordinated content to tell a story to user 902 in augmented reality. As an example, an aerial overview of a natural scene, such as a field, forest or body of water may play as though flying over the scene, while the foreground video plays over real world tableau 903 as the focal video. The background video may add an emotional or dimension or additional content to the AR experience (e.g., AR experience 900).

Figure 10:
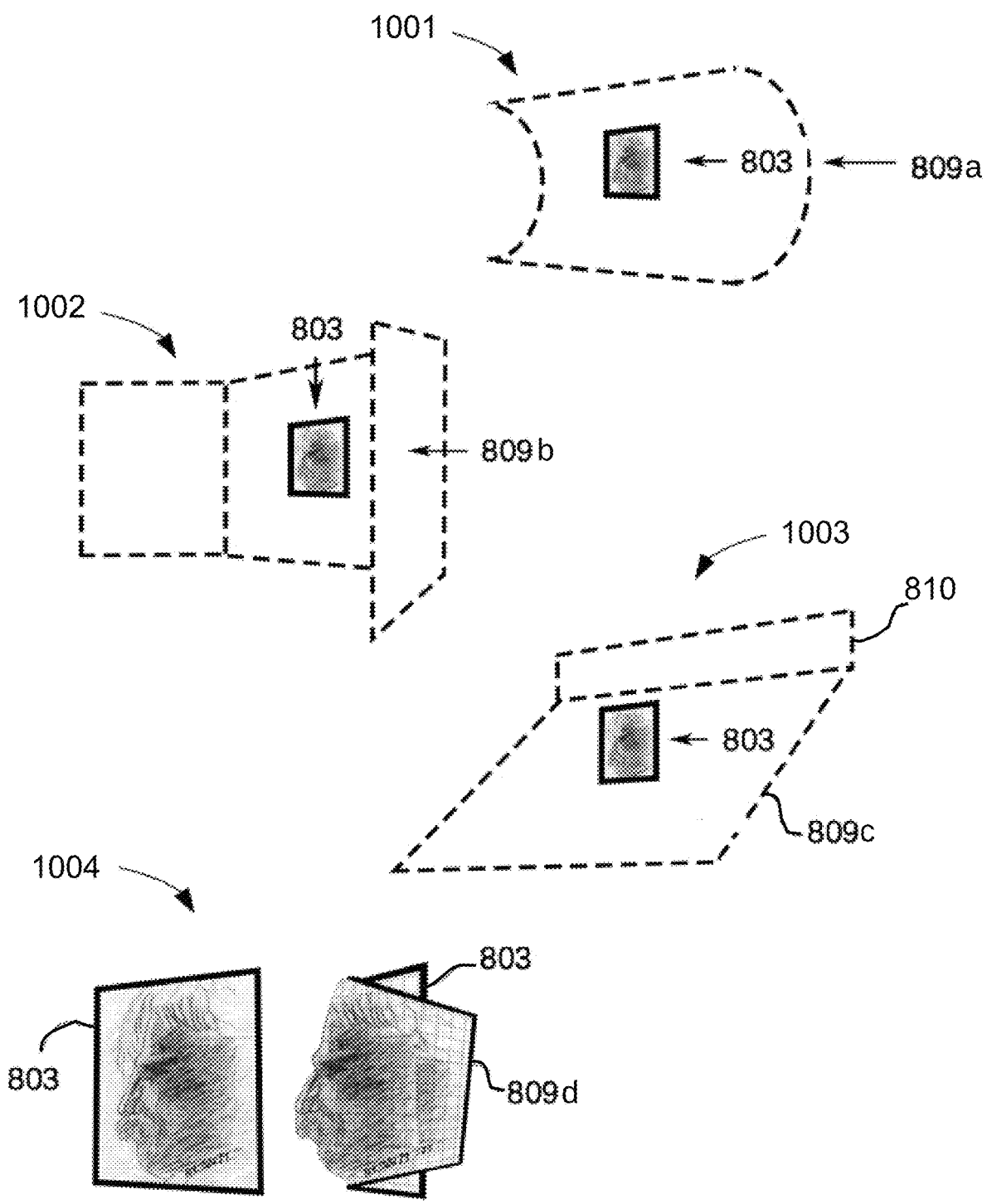
FIG. 10 illustrates exemplary shape embodiments of a 3D background virtual interactive surfaces, according to some embodiments of the disclosure.

FIG. 10 illustrates exemplary shape embodiments of secondary virtual interactive surfaces 909. In the illustrated embodiments, secondary virtual interactive surfaces 909 is in general non-planar, having a warped, curved or folded shape. The visual content of AR experience 900 may be enhanced by a three-dimensional background, by warping or folding the background scene (e.g., virtual background 909) such that the background is shown on a curved or folded viewing "screen". The non-planar virtual background 909 "screen" may enhance AR experience 900 by giving user 902 an impression of a realistic appearing background having depth and perspective.

In embodiment 1001, background surface 909a is warped to appear as a curved or hemi-cylindrical surface. Virtual interactive surfaces 903 may remain a flat surface as the focal point of the AR experience. A video playing on background surface 909 may appear distorted as if taken through a wide angle lens stretching the view to show elements above and below a horizon. Horizontal edges of the curved surface may have objects that appear closer to the user, exaggerating the three-dimensional experience for the user. In embodiment 1002, background surface 909b is displayed as three folded panels, where the outer panels are folded out of the surface of the central panel. Virtual interactive surfaces 903 is on the center panel of background surface 909b and provides the viewing region of a foreground video. The multiple panels of background surface 909b may display multiple videos simultaneously.

In embodiment 1003, background surface 909c is substantially planar and tilted, having a flap 910 along the upper edge and bent out of the surface of background surface 909. It is understood that background surface 909c may be bent in any number of suitable configurations. In some embodiments, flap 910 may be curved. As an example, a fly-over video may be played in bent background surface 909c. The ground motion may be magnified by the slope of the surface of background surface 909c, Flap 910 at the top of background surface 909c may be aligned with the horizon, so that the sky above the traveling ground video may seem stationary. This effect may give the foreground video playing in virtual interactive surfaces 903 an immersive environment that is especially suited to motion in a manner superior to that obtainable with a flat surface.

In embodiment 1004, background surface 909d is sculpted to appear as a three-dimensional relief of the two-dimensional print of the face shown in virtual interactive surfaces 903. Background surface 909d appears to be wrapped around and over virtual interactive surfaces 903. It will be understood that any sculpted shape may be created. The three-dimensional shape may be a relief of the two-dimensional content of the real world tableau, or may not be related to the two-dimensional objects. In some embodiments, the shape of background surface 909d may change dynamically to match the video content.

Persons skilled in the art will recognize from the previous description and from the figures and claims, modifications and changes can be made the embodiments of the disclosure without departing from the scope and spirit recited in the following claims.

I claim:

1. A method for creating augmented reality image, comprising:

capturing a digital image of a real-world object through a digital image capture device on a portable device comprising a microprocessor, wherein the digital image is displayed on a digital display of the portable device;

determining one or more sets of x,y,z coordinates of the real world object relative to the portable device, wherein at least one set of x,y,z coordinates is an anchor point for attaching an augmented reality image to the image of the real world object;

displaying a first prompt on the portable device, wherein the first prompt is anchored to the image of the real-world object;

receiving input from a user of the portable device in response to the first prompt;

in response to receiving the input, displaying one or more virtual interactive surfaces on the digital display near or over the digital image of the real-world object according to the determined one or more sets of x, y, z coordinates;

displaying a second prompt within each of the one or more virtual interactive surfaces on the digital display;

receiving a second input from the user in response to the second prompt, wherein one of the virtual interactive surfaces is selected; and in response to receiving the second input, displaying the augmented reality image on the selected virtual interactive surface, wherein the augmented reality image is a user selected digital media content displayed in the selected virtual interactive surface, wherein the digital media content is retrieved from a media file stored in a memory, wherein displaying the augmented reality image on the selected virtual interactive surface comprises displaying a three-dimensional shape that comprises a plurality of virtual three-dimensional objects, wherein the plurality of three-dimensional objects appear to the user of the portable device to be spatially separated from each other;

wherein the plurality of three-dimensional objects are aligned to appear as a contiguous shape only when the angle of view of the image capture device is substantially aligned to a target angle relative to a normal of the virtual interactive surfaces.

2. The method of claim 1, wherein displaying the augmented reality image in the selected virtual interactive surface comprises displaying digital media content from a media file stored in the memory.

3. The method of claim 2, wherein displaying digital media content from a media file stored in a memory comprises executing image recognition software, wherein the image recognition software analyzes the image of the real world object to find a match to a media file stored in the memory.

4. The method of claim 3, wherein recognizing one or more visual features of the digital image comprises searching binary data of the digital image for one or more patterns stored in a digital file stored in a second memory.

5. The method of claim 1, wherein determining one or more sets of x,y,z coordinates of the real world object relative to the portable device comprises updating the one or more sets of x,y,z coordinates of the real world object if a size of the real world object in a view field of the image capture device changes.

6. The method of claim 1, wherein displaying the augmented reality image on the selected virtual interactive surface comprises selecting a media file from the memory and displaying the content of the media file in the selected virtual interactive surface.

7. The method of claim 1, wherein displaying the augmented reality image on the selected virtual interactive surface comprises anchoring the digital image of the real world object, wherein each one of the one or more virtual interactive surfaces has a position in the display and that is relative to an anchor point on the digital image of the real world object.

8. The method of claim 1, wherein the first prompt is comprises any one of a visual icon anchored to the digital image of the real world object, an audible signal played by the portable device or a written message displayed on the digital display.

9. The method of claim 1, wherein displaying visual content within the selected virtual interactive surface comprises opening a media file and loading the media file into a memory coupled to the display on the image capture device and displaying a multimedia presentation on the selected virtual interactive surface.

10. The method of claim 1, wherein displaying one or more virtual interactive surfaces on the display comprises displaying one or more non-planar virtual interactive surfaces.

11. The method of claim 10, wherein displaying one or more non-planar virtual interactive surfaces comprises displaying one or more curved virtual interactive surfaces.

12. The method of claim 11, wherein:
the one or more curved virtual interactive surfaces have a convex curvature, wherein the one or more virtual interactive surface has a middle portion that extends into the foreground of the augmented reality scene; or
the one or more curved virtual interactive surfaces have a concave curvature,
wherein the one or more virtual interactive surfaces has a middle portion that extends into the background of the augmented reality scene.

13. The method of claim 11, wherein displaying one or more virtual interactive surfaces on the display comprises displaying one or more bent surfaces, wherein a first portion of the virtual interactive surfaces is coplanar with a first plane, and at least a second portion of the virtual interactive surfaces is coplanar with a second plane, and wherein the second plane intersects the first plane.

14. The method of claim 11, wherein displaying one or more virtual interactive surfaces on the display comprises displaying virtual interactive surfaces comprising a three-dimensional relief on at least a portion of the virtual interactive surfaces.

15. The method of claim 1, wherein displaying one or more virtual interactive surfaces on the display comprises displaying a first virtual interactive surface over a second virtual interactive surface, wherein a background media content is displayed on the second virtual interactive surface and a foreground media content is displayed on the first virtual interactive surface.

16. The method of claim 15, wherein displaying a first virtual interactive surface over a second virtual interactive surface comprises revealing the second virtual interactive surface after displaying the first virtual interactive surface, wherein the second virtual interactive surface is hidden before receiving the second input from the user.

17. A system, comprising:
a real world object;
a portable device, wherein the portable device comprises a microprocessor, a memory, an image capture device and a display, and wherein a digitized image of the real world object is stored in the memory; and
a memory storing executable instructions, wherein the executable instructions causes the system to perform a method comprising:
capturing a digital image of a real-world object through the image capture device of the portable device, wherein the digital image is displayed on the display of the portable device;
determining one or more sets of x,y,z coordinates of the real world object relative to the portable device, wherein at least one set of x,y,z coordinates is an anchor point for attaching an augmented reality image to the image of the real world object;
displaying a first prompt on the portable device, wherein the first prompt is anchored to the image of the real-world object;
receiving input from a user of the portable device in response to the first prompt;
in response to receiving the input, displaying one or more virtual interactive surfaces on the digital display near or over the digital image of the real-world object according to the determined one or more sets of x, y, z coordinates;
displaying a second prompt within each of the one or more virtual interactive surfaces on the digital display;

receiving a second input from the user in response to the second prompt, wherein one of the virtual interactive surfaces is selected; and in response to receiving the second input, displaying the augmented reality image on the selected virtual interactive surface, wherein the augmented reality image is a user selected digital media content displayed in the selected virtual interactive surface, wherein the digital media content is retrieved from a media file stored in a memory, wherein displaying the augmented reality image on the selected virtual interactive surface comprises displaying a three-dimensional shape that comprises a plurality of virtual three-dimensional objects, wherein the plurality of three-dimensional objects appear to the user of the portable device to be spatially separated from each other;

wherein the plurality of three-dimensional objects are aligned to appear as a contiguous shape only when the angle of view of the image capture device is substantially aligned to a target angle relative to a normal of the virtual interactive surfaces.

18. The system of claim 17, further comprising a digital network, wherein the portable device is networked to a remote server, the remote server comprising a storage memory, and wherein one or more media files are stored on the storage memory.

* * * * *